Jan. 10, 1961 J. M. COLE 2,967,439
PRECISION ROTARY INSTRUMENT
Filed June 26, 1958
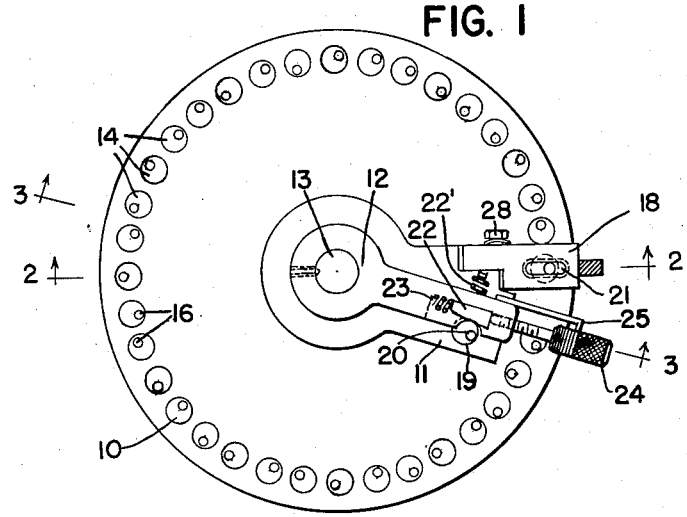
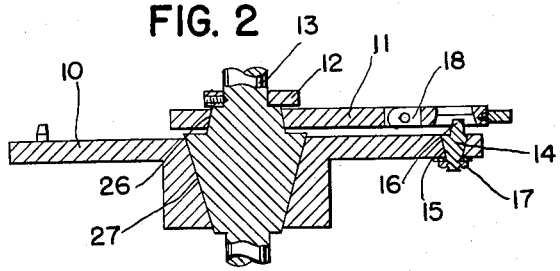
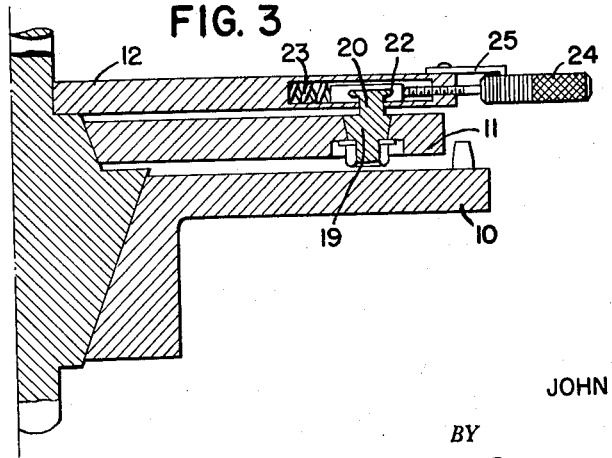
INVENTOR.
JOHN M. COLE

United States Patent Office 2,967,439
Patented Jan. 10, 1961

2,967,439

PRECISION ROTARY INSTRUMENT

John M. Cole, 2062A Mather Way, Elkins Park 17, Pa.

Filed June 26, 1958, Ser. No. 744,886

5 Claims. (Cl. 74—815)

(Granted under Title 35, U.S. Code (1952), sec. 266)

The invention described herein may be manufactured and used by or for the Government for governmental purposes without the payment of any royalty thereon.

This invention relates to angular positioning instruments, and more particularly, to an improved angular positioning instrument having a construction such that a high degree of precision is attained without the precise and costly machining operations heretofore involved in the manufacture of such instrument.

In the manufacture of instruments for the accurate angular positioning of a workpiece, it has been customary to machine the various parts of the instrument with a high degree of accuracy. In accordance with the present invention, this difficulty is avoided by the provision of an improved instrument wherein the angle determining elements are of inexpensive construction and are adjusted by the use of a master prism or gage to provide exact angles between themselves and the center of the base on which they are mounted. After such adjustment, the angle determining elements are clamped to the base.

The invention will be better understood from the following description when considered in connection with the accompanying drawings and its scope is indicated by the appended claims.

Referring to the drawings:

Fig. 1 is a top view of the improved precision rotary instrument,

Fig. 2 is a sectional view taken on the line 2—2 of Fig. 1, and,

Fig. 3 is a sectional view taken on line 3—3 of Fig. 1 indicating the relation between the parts of the fine adjustment mechanism of the instrument.

The instrument illustrated by these figures includes a base 10, an increment or coarse adjustment arm 11, a fine adjustment arm 12, and an output shaft 13 which positions the workpiece (not shown).

Mounted near the outer edge of the base 10 are a plurality of pegs 14 which are set in tapered bearings 15, have eccentric upward extensions 16, and are arranged to be clamped to the base 10 by nuts 17. Obviously, rotation of the pegs 14 produces a tangential displacement of the extensions 16 with respect to the center of the base. As a result, the pegs 14 can be adjusted to produce exact angles between the extensions 16 and the center of the base 10. This adjustment can be made very accurately by the use of a master prism or gage. Thereafter, the pins 14 are clamped to the base 10 by the nut 17.

The coarse adjustment arm 11 has pivoted to one of its sides by means of a pin 28, an index locking lever 18, and bears a pin 19 which has an upward eccentric extension 20 like the extensions 16 of the pins 14. The index lever 18 has a radial slot 21 which is so formed as to engage any selected one of the pegs 14 when it is in its lowermost position.

The fine adjustment arm 12 is fixed to the shaft 13 and encloses a wedge 22 which (1) is biased to its illustrated position (Fig. 1) by a spring 23, and (2) is moved longitudinally of the lever 12 by a fine adjustment member 24. A spring 22 exerts against the arm 12 a pressure by which the wedge 22 is held against the pin 20. The member 24 is shown as threaded into the end of the arm 12 and as bearing a scale associated with a pointer 25 for indicating the angle through which the arm is adjusted. Obviously, other conventional types of indicators are available for this purpose.

The angular position of the single eccentric peg 19 in the increment arm 11 is adjusted by using a master so that the tangential displacement produced by the wedge 22 and fine adjuster 24 will produce the exact angle as indicated on the fine adjuster. The taper wedge with its ratio effect makes the fine adjuster more sensitive by the amount of the ratio. For instance, a ten-to-one taper ratio makes the adjustment ten times as sensitive. The adjustment covers a range equal to the angle between the base pegs 14 so that any angle in the circle is readily attained.

The base 10, the increment arm 11 or the adjusting arm 12 are made independently rotatable by the provision of taper bearings 26 and 27 (Fig. 2). When the index locking arm 18 is moved from one of the base pegs 14 to another, the increment arm 11, adjusting arm 12 and shaft 13 move relative to the base, the arm 12 being coupled to the arm 11 through spring 22′, pin 20 and wedge 25 and the lower taper bearing 27 being used. When the fine adjuster 24 is moved, the arm 11 is fixed to the base 10 by engagement of the slot 21 with one of the pins 14 and the arm 12 rotates the shaft 13 in the bearings 26 and 27.

As previously indicated, the workpiece to be operated on is fixed to the shaft 13. In the operation of the instrument, the arm 11 is moved the number of increments that will produce the angle nearest but less than the desired one. The movement is completed by dialing the fine adjuster 25.

The herein disclosed instrument has the advantage that the eccentric pegs in the base can be adjusted to a master so that an exact angle will exist between them. This eliminates precise and costly machining which was the limiting factor on previous designs. Therefore, this increment accuracy is limited by the master to which it is adjusted. The pegs can be readjusted if wear or dislocation occurs. High sensitivity of the fine adjuster is obtained by using it in conjunction with the taper wedge. This makes it more sensitive than existing mechanical instruments. The sensitivity can be up to 25 times better. The adjustment is also very accurate because the single peg has an adjustable radius. This adjustability comes from the peg's eccentricity and can correct the net effect of all the tolerances involved. Therefore, the high total accuracy is maintained when using a combination of increment and adjusted angles. Lost motion is eliminated from all critical mating parts by use of taper fits.

Various sensitivities are easily obtainable by using different taper wedges. Considering the accuracy and sensitivity obtainable, this instrument is relatively simple to manufacture and use.

This instrument can be used anywhere accurate circular spacing or angular positioning is needed. For example, it may be used for (1) obtaining accurate angles in machine shop or machine work (layouts, jig borers, etc.), (2) obtaining accurate angles for testing servo components such as synchros, resolvers, etc., (3) obtaining accurate angles for designing and drafting purposes, or (4) obtaining accurate angles for navigational work.

I claim:
1. In an angular positioning instrument, the combination of a base formed to provide a first bearing, a plurality of coarse adjustment pegs mounted in tapered bearings in said base with extensions disposed to produce equal angles between themselves and the center of said base, a shaft arranged to rotate in said first bearing and formed to provide a second bearing, a coarse adjustment arm rotatable about said second bearing, a single peg having an extension displaced from its central axis and mounted in a tapered bearing in said coarse adjustment arm, an index lever hinged to said coarse adjustment arm and having a slot formed to engage said coarse adjustment pegs, and a fine adjustment arm fixed to said shaft and including a wedge movable between said fine adjustment arm and the extension of said single peg.

2. In an angular positioning instrument, the combination of a base formed to provide a first bearing, a plurality of coarse adjustment pegs and mounted in tapered bearings in said base with extensions disposed to produce equal angles between themselves and the center of said base, a shaft arranged to rotate in said first bearing and formed to provide a second bearing, a coarse adjustment arm rotatable about said second bearing, a single peg having an extension displaced from its central axis and mounted in a tapered bearing in said coarse adjustment arm an index lever hinged to said coarse adjustment arm and having a slot formed to engage said coarse adjustment pegs, a fine adjustment arm fixed to said shaft and including a wedge movable between said fine adjustment arm and the extension of said single peg, and means for moving said wedge longitudinally of said fine adjustment arm.

3. An angular positioning instrument according to claim 2 wherein said wedge positioning means is calibrated to indicate the angle through which said shaft is rotated by movement of said wedge.

4. In an angular positioning instrument, the combination of a base formed to provide a first bearing, a plurality of coarse adjustment pegs mounted in said base and having extensions displacement from their central axes, a shaft rotatable in said first bearing and formed to provide a second bearing, a coarse adjustment arm rotatable about said second bearing, a single peg having an extension displaced from its central axis and mounted in said coarse adjustment arm, an index lever pivoted to said coarse adjustment arm and having a slot formed to engage said coarse adjustment pegs, a fine adjustment arm fixed to said shaft and including a wedge movable between said fine adjustment arm and the extension of said single peg, and means for adjusting said wedge longitudinally of said fine adjustment arm.

5. An instrument according to claim 4 wherein said wedge is spring biased toward its narrower edge and said fine adjustment arm is spring biased to maintain said wedge in engagement with said single pin.

References Cited in the file of this patent

UNITED STATES PATENTS

| | | |
|---|---|---|
| 333,631 | Holz | Jan. 5, 1886 |
| 1,309,593 | Bolgiano | July 8, 1919 |
| 2,782,486 | Delameter | Feb. 26, 1927 |

FOREIGN PATENTS

| | | |
|---|---|---|
| 506,368 | France | Aug. 20, 1920 |
| 606,073 | Great Britain | Aug. 5, 1948 |